United States Patent [19]

Smith, Jr.

[11] Patent Number: 4,578,580

[45] Date of Patent: Mar. 25, 1986

[54] GAMMA SPECTRUM POROSITY MEASUREMENT

[75] Inventor: Harry D. Smith, Jr., Houston, Tex.

[73] Assignee: Halliburton Company, Duncan, Okla.

[21] Appl. No.: 574,761

[22] Filed: Jan. 27, 1984

[51] Int. Cl.[4] ............................................. G01V 5/00
[52] U.S. Cl. ................................................. 250/269
[58] Field of Search ........................ 250/256, 269, 270

[56] References Cited

U.S. PATENT DOCUMENTS

| | | | |
|---|---|---|---|
| 3,202,822 | 8/1965 | Kehler | 250/269 |
| 3,843,881 | 10/1974 | Barton, Jr. et al. | 250/269 |
| 3,864,569 | 2/1975 | Tittman | 250/269 |
| 4,048,495 | 9/1977 | Ellis | 250/269 |
| 4,297,575 | 10/1981 | Smith, Jr. et al. | 250/269 |

Primary Examiner—Janice A. Howell
Attorney, Agent, or Firm—W. J. Beard

[57] ABSTRACT

A method and apparatus for logging downhole earth formations which converts, for a given logging tool geometry, a measurement of the extent of energy degradation of the spectrum of gamma rays emitted from a source in the tool and Compton scattered by the formation back to the tool, into a measurement of the density of the formation.

9 Claims, 2 Drawing Figures

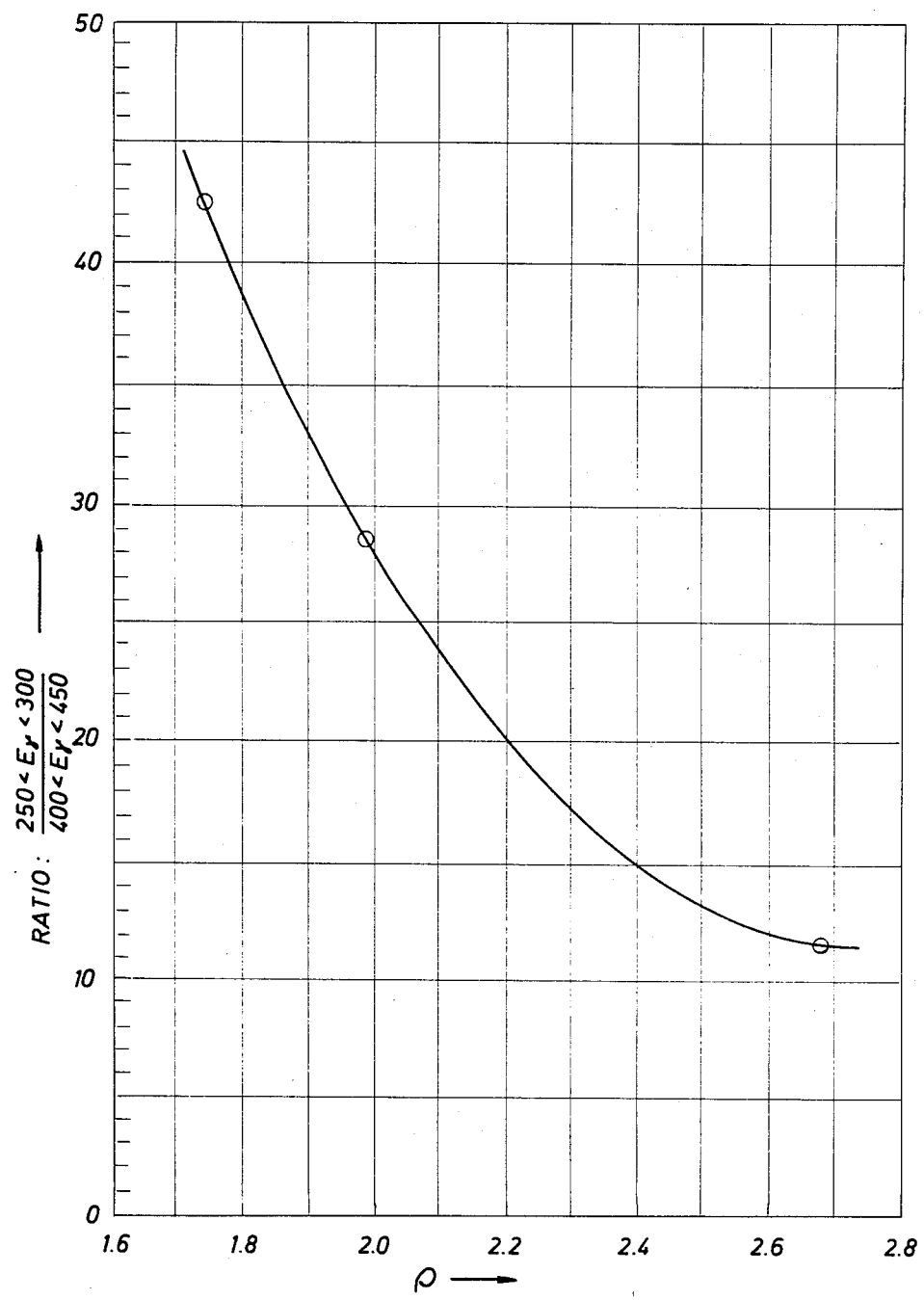

GAMMA SPECTRUM POROSITY MEASUREMENT

BACKGROUND OF THE INVENTION

The present invention relates to methods and apparatus for logging earth formations penetrated by a borehole, and more particularly to methods and apparatus for measuring the density of downhole earth formations by means of gamma rays emitted from a logging tool into the formation and Compton scattered back to the tool.

In recent years nuclear well logs measuring the density of downhole earth formations have become increasingly important to petroleum engineers and log analysts. Porosities derived from density logs can be combined with measurements from resistivity or pulsed neutron logs to produce calculations of formation water saturations. Other combinations of density log data with that from sonic and/or neutron porosity logs can be used to determine formation lithology and to indicate formations with significant gas saturations. In certain areas even unsupplemented density log data can provide sufficient information to evaluate the formations of interest.

Density logging is based on the detection of attenuated gamma rays emitted from a radioactive source in a downhole tool. The gamma rays from the source penetrate through the toolcase, borehole, and formation. A fraction of these gamma rays are Compton scattered into and counted by one or more gamma ray detectors in the tool. The attenuation the gamma rays undergo between the source and detector(s) can, under certain conditions, be very simply related to formation bulk density. As a reasonable generalization, the count rate will decrease exponentially as the density of the formation/borehole system increases, and also as the source-detector spacing increases.

Gamma rays interact with matter principally by three processes: photoelectric absorption, pair production, and Compton scattering. Of these processes, only Compton scattering is not highly dependent upon the specific elements in the medium, depending instead upon only the density of the medium (the density being directly related to the number of electrons per unit volume). Photoelectric absorption and pair production, on the other hand, are strongly related to the atomic number Z of the nuclei in the formation and exhibit very strong gamma ray energy dependence. Therefore, current density logging tools are designed to respond only to Compton scattered gamma radiation, the selective response to such Compton scattered gamma radiation being achieved by proper selection of gamma ray energies and proper detector shielding.

Typically, present day density tools therefore measure density by observing an integrated Compton scattered gamma ray count rate over a broad, predetermined energy band. Since the higher density formation materials have higher gamma attenuation coefficients, the integrated count rate at the gamma ray detector in the logging tool will be lower when higher density material is present between the source and the detector. Using predetermined relationships, the count rates can then be converted into a measure of the formation density, and hence porosity. In some tools, two detectors are used to provide borehole (especially mudcake) compensation, but the measurement principle used in each detector is the same.

However, although some existing density logging tool configurations provide high quality measurements, a need still remains for improved Compton scattered gamma ray density measurement apparatus and methods. Preferably such methods and apparatus will offer density measurements, perhaps even with the same data generated by existing tools, but using different computational methods which are independent of the more conventional methods.

SUMMARY OF THE INVENTION

Briefly, the present invention meets the above needs and purposes with a density logging method and apparatus which can utilize the same density gamma ray source, pad, and detector(s) currently used in many density tools. However, the measurement concept is entirely different. Instead of looking at an integrated Compton scattered gamma ray count rate over a broad energy range, the shape itself of the energy spectrum of the Compton scattered and attenuated gamma rays is measured. By looking at specific energy bands or ranges, the spectral energy shift due to the Compton scattering is determined. From this data the average energy lost by the gamma rays due to the Compton scattering can be determined. This in turn specifies the average scattering angle of the gamma rays which left the source and reached the detector. From the source-detector spacing (geometry) and this scattering angle information, the depth of investigation can be determined. The depth of investigation, in turn, relates directly to the formation density.

To examine these concepts, Monte Carlo calculations were done which very accurately simulated an existing dual detector density logging tool currently in commercial use by the assignee of the present invention. Included in these calculations were proper collimation angles, shielding, detector positions, tool case design, borehole, and formation parameters. A specific calculation was implemented to determine the relative count rates at each detector as a function of depth into the formation/borehole. Table I (below) presents, as a function of depth into the formation, the percentage of the formation count rate in each detector for two different density formations ($\rho = 1.74$ g/cc and $\rho = 2.60$ g/cc).

TABLE I

| | Depth into Formation (inches) | % of Formation Signal ($\rho = 1.74$) | % of Formation Signal ($\rho = 2.60$) |
|---|---|---|---|
| Short | 0.–1.75 | 73 ± 2 | 83 ± 5 |
| Spaced | 1.75–5.75 | 26 ± 1 | 17 ± 2 |
| Detector | 5.75–11.75 | 0.4 ± 0.6 | 0.04 |
| Long | 0.–1.75 | 43 ± 4 | 59 ± 15 |
| Spaced | 1.75–5.75 | 52 ± 6 | 40 ± 5 |
| Detector | 5.75–11.75 | 5 ± 0.5 | 1 ± 0.3 |

It will be seen that in both detectors there is a trend to a greater depth of investigation in the lower density formation. The greater depth of investigation implies two additional things: (1) the path length of a gamma ray which reaches either detector is longer in the lower density material, and (2) the average scattering angle must be larger in the lower density material for gamma rays which reach the detector, since the source-detector spacing is fixed.

Now, although depth versus energy degradation has been used to doubly compensate a density measurement for borehole effects (see U.S. Pat. No. 4,084,495), the present invention relates to this effect for a new and entirely different application. That is, since the gamma rays which reach the detector in low density materials travel farther into the formation and are scattered through a greater angle, they will be degraded to a lower average energy when they are counted. Therefore, a measurement of the shape of the scattered gamma ray energy spectrum will be density dependent, with more degradation in low density formations.

The present invention takes advantage of this newly recognized phenomenon. The method and apparatus of the present invention employ a density tool which is designed so that the Compton scattered gamma ray spectrum (or predetermined portions thereof) can be obtained. From this a separate measure of the formation density can be deduced, independently of the conventional attenuation measurements commonly made to obtain density.

More specifically, in the preferred embodiment of the present invention, both a method and an apparatus are contemplated in which gamma rays are emitted into the formation from a source, such as $Cs^{137}$, with a density logging tool located in the borehole substantially adjacent the formation of interest. The logging tool includes one or more gamma ray detectors which form part of a gamma ray detection system. Each detector is located at a predetermined distance from the source, and is shielded from gamma rays emitted directly toward it from the gamma ray source.

Using the gamma ray detector(s), the shape of the gamma ray spectrum which is Compton scattered back to the borehole is measured. This can be done simply by measuring the count rates in two energy ranges, for example from 250–300 KeV and 400–450 Kev. By taking the ratio of these measurements, an energy degradation parameter, or measure of the degradation of the gamma ray spectrum due to attenuation of the gamma ray energies from the Compton scattering, can be derived. Since the geometry of the tool controls which scattered gamma rays are most likely to be received and detected by the detectors, a relationship, either theoretical or experimental, as desired, can be specified to convert the energy degradation parameter to a measure of the density of the formation. Ordinarily, this result will then be recorded at the surface by conventional logging tool support equipment.

It is therefore a feature of the present invention to provide an improved density logging method and apparatus for measuring the density of downhole earth formations; such a method and apparatus in which gamma rays, having energies above the threshold below which photoelectric absorption from formation and/or borehole elements becomes significant, are emitted into the formation; in which the specific attenuation in overall Compton scattered gamma ray counts is not a feature of the density measurement; in which instead a measure is made of the shape of the energy spectrum of the attenuated gamma rays which are Compton scattered back to the borehole; in which a measure of the density of the formation is then derived from the spectrum shape measurement; and to accomplish the above purposes in an accurate, sensitive, versatile, and reliable method and apparatus readily suited to the widest possible use in measuring the density of earth formations.

Other features and advantages of the invention will be apparent from the following description, the accompanying drawings and the appended claims.

BRIEF DESCRIPTION OF THE DRAWINGS

FIG. 2 is a graphical representation showing the degradation ratio as a function of formation density.

DESCRIPTION OF THE PREFERRED EMBODIMENTS

Figure 1:
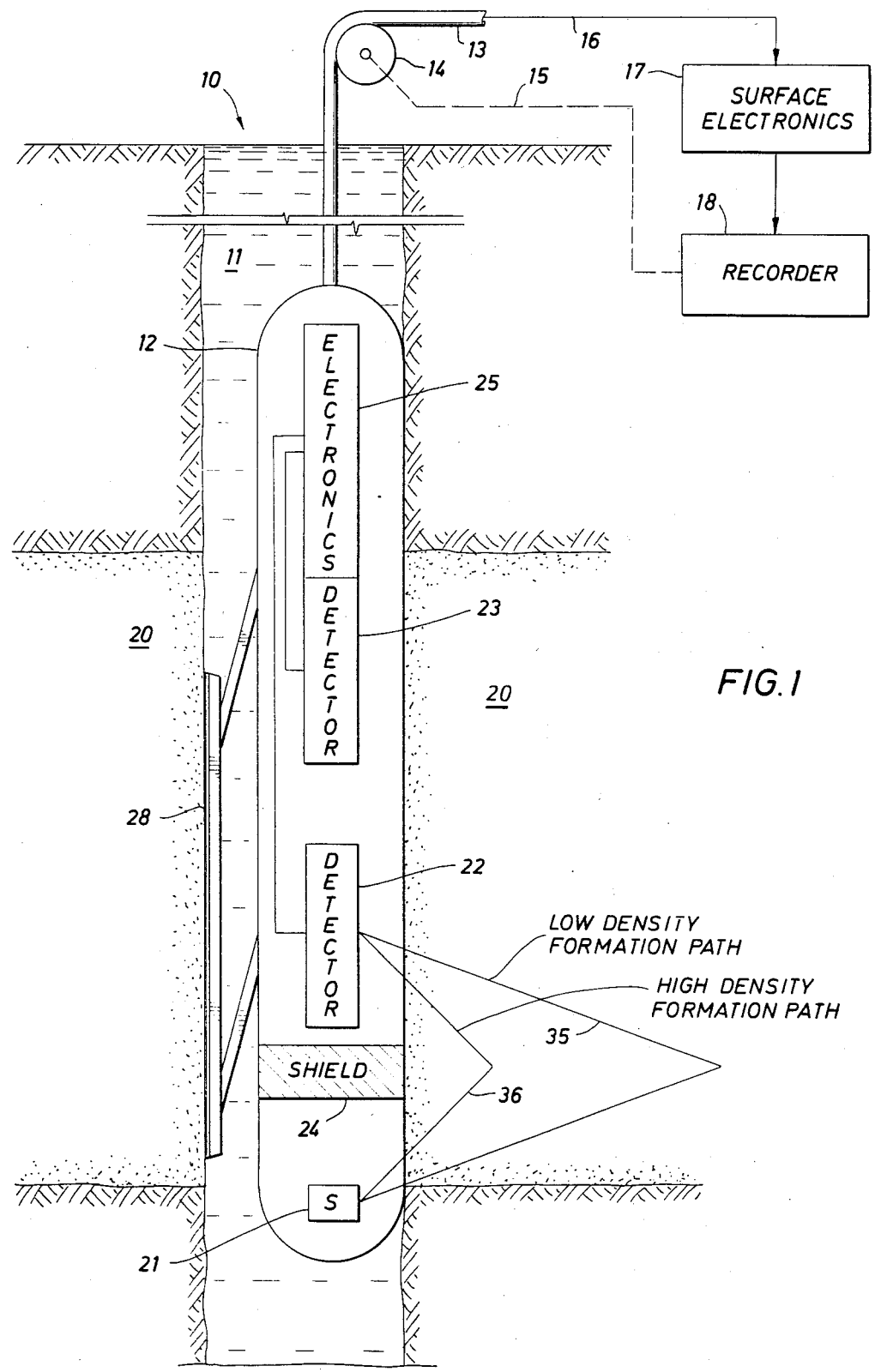
FIG. 1 is a somewhat figurative illustration showing a well logging system for performing earth formation density measurements in a borehole according to the present invention.

With reference to the drawings, the new and improved apparatus for measuring the density of downhole earth formations penetrated by a borehole, and the method therefor according to the present invention, will be described. FIG. 1 shows schematically a well logging system suitable for performing the present invention. As shown therein, a well borehole 10 is filled with a borehole fluid 11 and penetrates the earth formations 20 to be investigated. A downhole well logging sonde 12 is suspended in the borehole 10 by means of a conventional armored logging cable 13, in a manner known in the art. Cable 13 provides for raising and lowering the sonde through the borehole and contains one or more electrical conductors 16 for communicating between the sonde 12 and a surface electronics package 17, as desired.

A sheave wheel 14 at the surface, over which cable 13 passes, is electrically or mechanically coupled, as indicated by dotted line 15, to a well logging recorder 18. Recorder 18 may comprise an optical recorder or magnetic tape, or both, as known in the art, for recording the measurements made by the downhole sonde 12 as a function of the depth in the borehole of the sonde 12.

In the downhole sonde 12, a gamma ray source 21, such as $Cs^{137}$ (which emits gamma rays having initial energies of 0.66 MeV), is separated from near and far gamma ray detectors 22 and 23, respectively, by a suitable gamma ray shield 24. Shield 24 shields the detectors 22 and 23 from gamma rays emitted directly toward them from the gamma ray source 21. Detectors 22 and 23, in turn, are connected to control and telemetry electronics unit 25 which controls the detectors, receives count rate and energy information therefrom, and telemeters information measured by the detectors to the surface by means of the logging cable 13.

A skid 28 decentralizes the sonde 12 in borehole 10 and holds the sonde tightly against the wall of the borehole, to reduce mudcake effects.

Two detectors (22 and 23) are shown in FIG. 1 to demonstrate that the present invention is suitable for use with many existing borehole density measuring tools, whether single or multiple detector. However, only the gamma ray paths for one of the detectors are illustrated. Shown in FIG. 1 are gamma ray paths 35 and 36, respectively for low density and high density formations, for the near detector 22. Similar geometries will be relevant, of course, to detector 23.

As may be seen therein, the average path length 35 of the Compton scattered gamma rays which reach the detector in low density materials is longer than the path length 36 in high density materials. Therefore, since the source-detector spacing for any given detector is constant at any given time, the average scattering angle of the gamma rays which reach the detector will be larger in lower density materials (FIG. 1). Scattering through a larger angle will result in a greater average energy loss, which will manifest itself as a lower average gamma ray energy in the gamma rays which are counted in the detector 22. Therefore, a measurement of the shape of the scattered gamma ray energy spectrum will be density dependent, with more energy degradation in low density formations. This phenomenon is independent, of course, from the usual density measurements which measure the attenuation in the overall Compton scattered gamma ray count rate across a broad energy spectrum.

Several methods may be followed to measure the amount of energy degradation. For example, a curve fit may be made over an energy range above the threshold below which photoelectric absorption from formation and/or borehole elements becomes significant. Even more simply, a ratio of count rates in two predetermined energy ranges may be used to define the degradation parameter.

FIG. 2 shows a graphical representation of such a ratio as a function of formation density for data from an actual density tool scintillation detector. The numerator in this case is the count rate in a lower gamma ray energy range of about 250–300 KeV. The denominator is the count rate in a higher range of about 400–450 KeV. As may clearly be seen in FIG. 2, there is a very strong degradation effect as a function of formation density.

FIG. 2 illustrates one method for converting the degradation parameter to a measure of the density of the formation: a graphical solution which may be based upon (calibrated using) actual physical measurements of known formations. Or, as suggested earlier, actual spectral curve fits may be made. Similarly, experimental or theoretical relationships may be specified to relate the spectrum shape measurement to the density of the formation. The particular choice will depend upon the objectives at hand, and will be clear to a person of ordinary skill in the art upon reading and understanding the present specification.

As may be seen, therefore, the present invention has numerous advantages. It is extremely versatile. Many of the density measurements may be made with the same data generated by existing tools, of course using different computational methods which are independent of the more conventional methods. For, example, the specific attenuation in overall Compton scattered gamma ray counts, which is the major parameter measured by conventional techniques, is not a feature of the density measurement according to the present invention. In the present invention, the energy ranges selected may be changed to accommodate the particular circumstances at hand, such as to minimize statistics and/or gain shift sensitivity. Also, to correct for mud cake using a two detector system, a degradation effect measurement in each detector may be made, and the two measurements then combined in known fashion (cf., the U.S. Pat. No. '495 patent, above) to provide near tool density corrections, if desired. Additionally, since the measurements made according to the present invention are entirely independent of the conventional density measurements made with the same tool, the results of the present invention may have different lithology, shale, and/or gas effects, under certain circumstances, from the conventional density measurement. In such a case, a cross plot, for example, of the porosity measured by the present invention with that measured by the conventional density method could be employed to obtain lithology and/or gas saturation information using only one tool 12. This technique may be extended to cross plotting with other porosity devices to provide similar information.

While the methods and forms of apparatus herein described constitute preferred embodiments of this invention, it is to be understood that the invention is not limited to these precise methods and forms of apparatus, and that changes may be made therein without departing form the scope of the invention.

What is claimed is:

1. A density logging method for measuring the density of downhole earth formations penetrated by a borehole, comprising:
    (a) emitting gamma rays from the borehole into the formation to be measured, the energy spectrum of the gamma rays including energies above the threshold below which photoelectric absorption from formation and/or borehole elements becomes significant,
    (b) obtaining with a gamma ray detection system a measure of the shape of the energy spectrum of the attenuated gamma rays which are Compton scattered back to the borehole, and
    (c) deriving from the spectrum shape measurement a measure of the density of the formation.

2. The method of claim 1 wherein said step of deriving the measure of the density of the formation includes deriving an energy degradation parameter indicative of the degradation of the gamma ray spectrum above said threshold due to Compton scattering, and converting the energy degradation parameter, as a function of the spacing of the source of the gamma rays from the detection system, to the measure of the density of the formation.

3. The method of claim 1 wherein said step of obtaining a measure of the shape of the energy spectrum of the attenuated gamma rays further comprises measuring the count rates in two energy ranges above said threshold, the second range being at least partially higher than the first.

4. The method of claim 3 wherein said step of deriving the measure of the density of the formation comprises taking the ratio of the count rate measurement in the first energy range to the measurement in the second energy range.

5. The method of claim 3 wherein the first energy range extends from substantially 250 KeV to substantially 300 KeV, and the second energy range from substantially 400 KeV to substantially 450 Kev.

6. The method of claim 1 wherein said step of emitting gamma rays into the formation to be measured further comprises emitting the gamma rays from a source within a tool containing the gamma ray detection system and located in the borehole substantially adjacent the formation.

7. The method of claim 6 further comprising shielding the detection system from gamma rays emitted directly toward it from the gamma ray source.

8. The method of claim 6 wherein the gamma ray detection system includes two separate gamma ray detectors located at differently spaced distances from the gamma ray source.

9. A density logging method for measuring the density of downhole earth formations penetrated by a borehole, comprising:
    (a) emitting gamma rays into the formation to be measured from a $Cs^{137}$ source within a tool containing a gamma ray detection system and located in the borehole substantially adjacent the formation, the gamma ray detection system including at least two separate gamma ray detectors located at differently spaced distances from the gamma ray source, (b) shielding the detection system from gamma rays emitted directly toward it from the gamma ray source, (c) obtaining with the gamma ray detection system a measure of the shape of the energy spectrum of the attenuated gamma rays which are Compton scattered back to the borehole by measuring the count rates in two energy ranges, the first energy range extending from substantially 250 KeV to substantially 300 Kev, and the second from substantially 400 KeV to substantially 450 KeV, (d) deriving from the spectrum shape measurement an energy degradation parameter indicative of the degradation of the gamma ray spectrum due to Compton scattering by taking the ratio of the count rate measurement in the first energy range to the measurement in the second energy range, (e) converting the energy degradation parameter, as a function of the spacing of the gamma ray source from at least one of the detectors, to a measure of the density of the formation, and (f) recording the density measure.

* * * * *